UNITED STATES PATENT OFFICE.

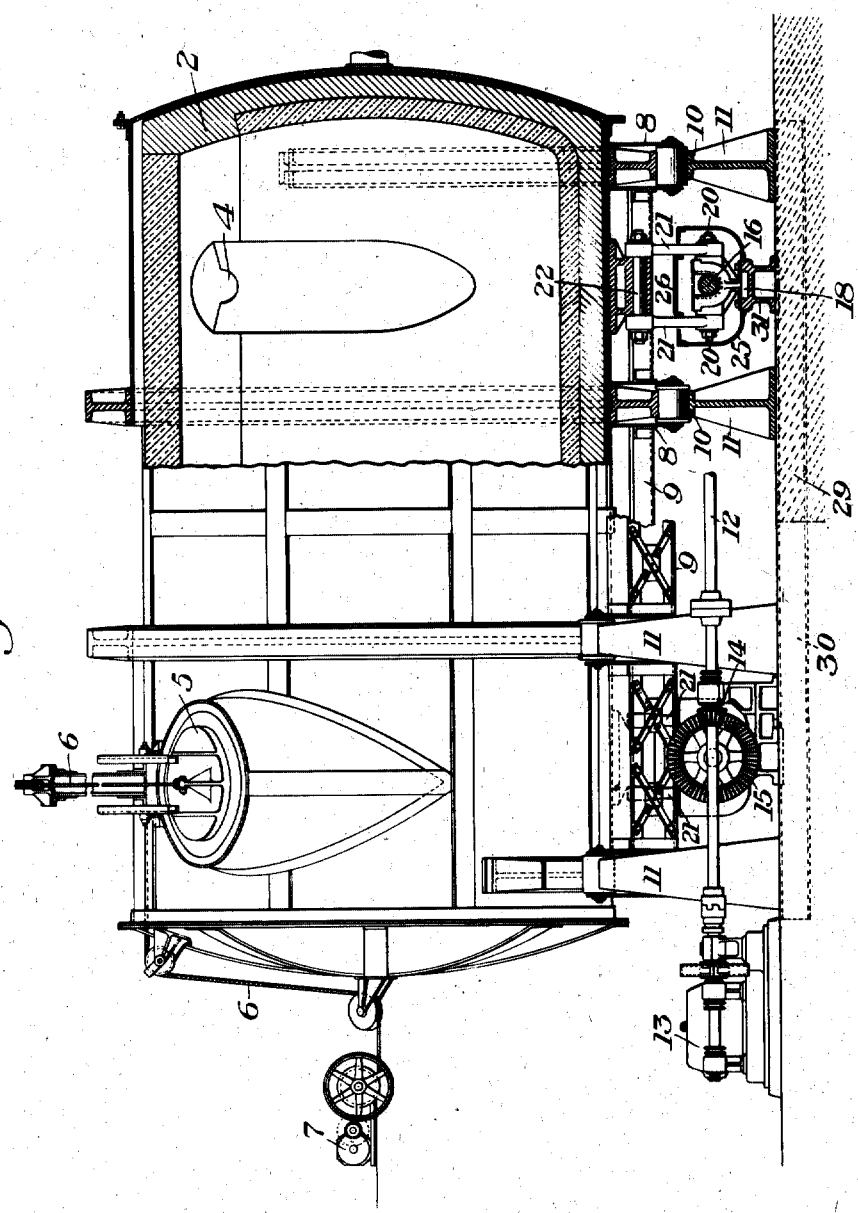

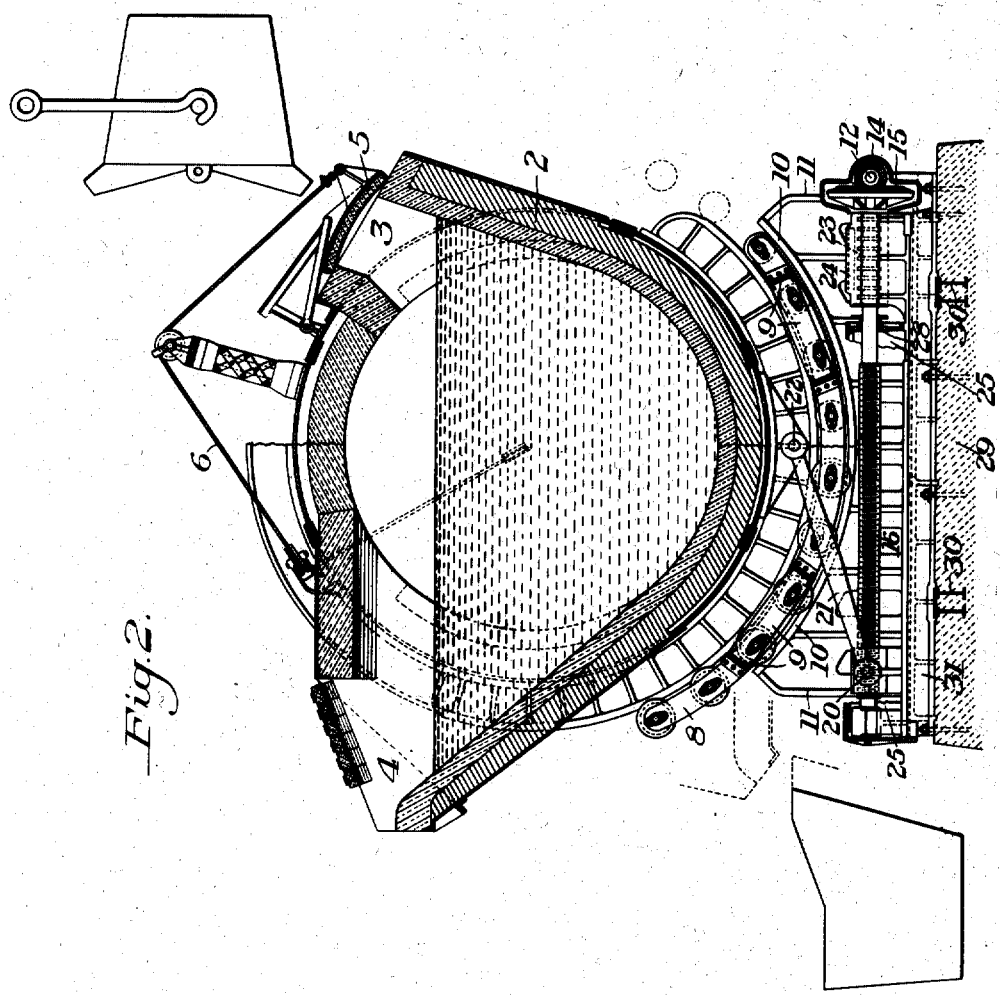

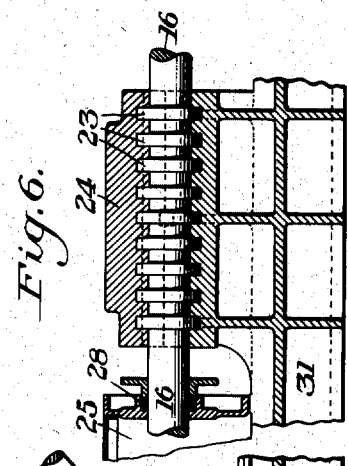
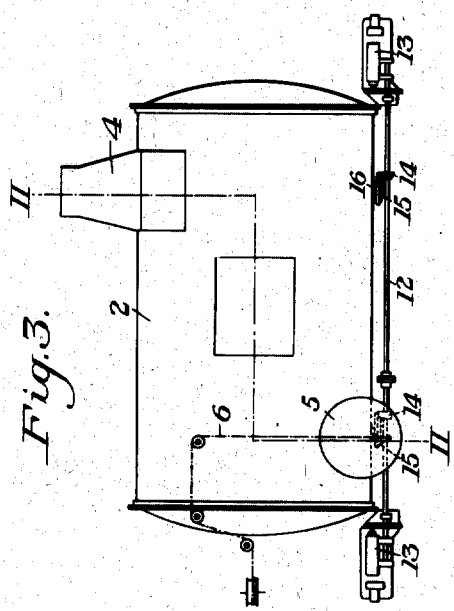
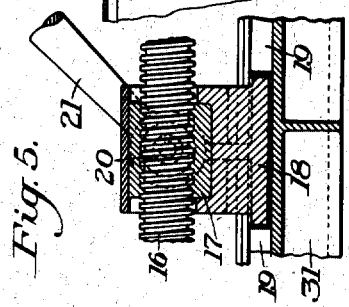
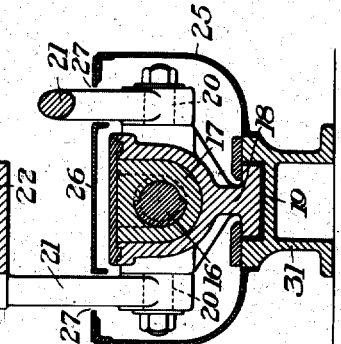

JOHN K. FURST, OF NEW CASTLE, PENNSYLVANIA, ASSIGNOR TO PENNSYLVANIA ENGINEERING WORKS, OF NEW CASTLE, PENNSYLVANIA, A CORPORATION OF PENNSYLVANIA.

HOT-METAL MIXER.

1,254,035.

Specification of Letters Patent.

Patented Jan. 22, 1918.

Application filed June 17, 1915. Serial No. 34,631.

*To all whom it may concern:*

Be it known that I, JOHN K. FURST, a citizen of the United States, residing at New Castle, in Lawrence county, Pennsylvania, have invented a new and useful Improvement in Hot-Metal Mixers, of which the following is a full, clear, and exact description, reference being had to the accompanying drawings, forming part of this specification, in which—

Figure 1 is a view partly in side elevation and partly in vertical section of a hot metal mixer, embodying my invention;

Fig. 2 is a section, the plane of section being on the irregular line II—II of Fig. 3;

Fig. 3 is a plan view largely diagrammatic; and

Figs. 4, 5 and 6 are detail sectional views hereinafter more fully described.

My invention has relation to hot metal mixers and more especially to the construction of certain features of hot metal mixers of large capacity.

The object of my invention is to provide actuating means of novel and efficient character, whereby the mixer may be readily tipped, in connection with an efficient supporting base for the parts.

Referring to the accompanying drawings, in which I have shown the preferred embodiment of my invention, the numeral 2 designates the mixing vessel proper, which is of the usual approximately cylindrical type having a filling opening 3 at one side and end thereof, and a pouring spout 4 at the opposite side and other end thereof, see Fig. 3. 4ª designates a plurality of brick arches which cover a portion of the pouring spout, see Fig 2. 5 designates the cover for the filling opening, and 6 any suitable connections operated by a motor 7, for opening and closing the cover.

The mixer is supported at intervals throughout its length upon a series of roller cradles 8, the several cradles being rigidly connected with each other by means of longitudinally extending girders 9. Each of the roller cradles is mounted to travel upon a track 10, carried by a support 11.

The numeral 12 designates a longitudinally extending actuating shaft which, as shown in Fig. 3, is preferably geared to an actuating motor 13, at each end. The shaft 12 carries two beveled gears 14, each of which meshes with a beveled gear 15, on a transversely arranged screw shaft 16. One of these screw shafts is arranged underneath each end portion of the mixer and about midway between the adjacent pair of roller cradles. Each shaft 16 carries a traveling nut 17, having a base 18, arranged to slide in a guideway 19. Each nut has laterally projecting studs 20, and sleeved upon these studs are links or pitmen 21, whose upper ends are sleeved on shafts 22, mounted in the under side of the body of the mixer. Each screw shaft 16 is provided with suitable thrust bearings 23, as best shown in Fig. 6. This figure shows one of these bearings as consisting of a plurality of collars fixed to the shaft and working in a thrust block 24. Each shaft 16 is inclosed in a casing 25 (partially broken away in Fig. 2) and which is preferably kept filled with oil. The cover plates 26 of this casing have slots 27, for the pitmen 21. At the ends, where the shaft extends through the casing, a suitable stuffing box 28 (shown in Fig. 6) is provided.

The entire structure is preferably mounted upon a concrete base 29, in which are embedded a plurality of longitudinally extending beams 30. The supporting stands 11 and the supporting stands 31 for the casing 25 are all firmly secured to the base 29 and bolted to the beams 30. This gives a very secure base capable of supporting the very great weight of the mixer and its contents.

My invention provides supporting and operating mechanism for metal mixers of very great capacity, up to one thousand tons or more. By means of the double motors and double screws and their actuating connections with the body of the mixer, the movements of the latter can be accurately controlled; and in case of failure of one of the motors 13, the other one will hold the load. The screws 16 and the nuts 17 being arranged to travel in oil, these parts are kept well lubricated and a steady even movement is obtained.

I claim:

1. A tiltable hot metal mixer comprising a cylindrical shell having closed ends, annular tracks surrounding said shell and forming reinforces therefor, an arc-shaped support for the mixer, and roller bearings on the arc-shaped support for the annular tracks, substantially as described.

2. A tiltable hot metal mixer, comprising a cylindrical shell having closed ends, annular tracks surrounding said shell and forming reinforces therefor, an arc-shaped support for the mixer below said tracks, a carriage having anti-friction rollers connected thereto between each of said tracks and the arc-shaped support, the arrangement being such that the mixer can be tilted about the axis of the shell, there being a receiving opening through one side of the shell and a pouring spout through the other side thereof, said receiving opening and spout being above the horizontal center of the shell when said shell is in its normal position, substantially as described.

3. A tiltable hot metal mixer, comprising a cylindrical shell having closed ends, annular tracks surrounding said shell and forming reinforces therefor, an arc-shaped support for the mixer below said tracks, a carriage having anti-friction rollers connected thereto between each of said tracks and the arc-shaped support, the arrangement being such that the mixer can be tilted about the axis of the shell, there being a receiving opening through one side of the shell and a pouring spout through the other side thereof, said receiving opening and spout being above the horizontal center of the shell when said shell is in its normal position, and actuating mechanism connected to the shell and arranged to tilt the same, substantially as described.

4. A tiltable hot metal mixer, comprising a cylindrical shell having closed ends, supports for said shell arranged to permit the mixer to oscillate about the axis of the shell, there being a receiving opening through one side of the shell and at one end thereof, there also being a pouring spout through the other side of the shell and the other end of the shell, the arrangement being such that the metal which is poured into the mixer is mixed with the metal therein during its passage from one end of the mixer to the other by the rotation of the mixer during the pouring and charging, said receiving opening and spout being above the horizontal center of the shell when said shell is in its normal position, substantially as described.

5. A tiltable hot metal mixer, comprising a shell having closed ends, supports for said shell arranged to permit the mixer to oscillate, means for tilting said furnace, there being a receiving opening through one side of the shell and a pouring spout through the other side thereof; a closure for the receiving opening supported on the mixer, and means connected to the closure for raising said closure, said means extending to a point adjacent to the axis of the mixer and at one end thereof, the arrangement being such that the mixer can be oscillated without affecting the actuating connections, substantially as described.

In testimony whereof I have hereunto set my hand.

JOHN K. FURST.

Witnesses:
Wm. J. Wheeler,
Lee E. Allen.